Patented Aug. 5, 1947

2,425,177

UNITED STATES PATENT OFFICE 2,425,177

TURBINE CONSTRUCTION

Val Cronstedt, Marlboro, Conn., assignor to United Aircraft Corporation, East Hartford, Conn., a corporation of Delaware Application May 11, 1943, Serial No. 486,617

10 Claims. (Cl. 253—69)

This invention relates to a turbine driven by hot gases and particularly adapted for use in aircraft propulsion.

As the turbine elements expand when heated by the driving fluid, maintenance of alignment between the rotor and casing is difficult and the turbine elements may be damaged by unintended contacts between the elements. An object of the invention is to overcome this difficulty by mounting the casing and the rotor so that they will be held in predetermined relative positions regardless of axial and radial expansion.

A feature of the invention is a housing within which the casing carrying the stationary turbine blades, and the rotor, are separately mounted in order that expansion of the casing will not affect the mounting of the rotor, and the axes of the casing and rotor will, therefore, remain concentric independently of expansion.

If a turbine is driven by heated gases, the elements of the turbine in contact with these gases are subject to extremely high temperatures, and a feature of the invention is a housing with which the hot gases do not come in contact and which supports the turbine casing and rotor in predetermined inter-relationship.

Other objects and advantages will be apparent from the specification and claims, and from the accompanying drawings which illustrate what is now considered to be a preferred embodiment of the invention.

Figure 1:
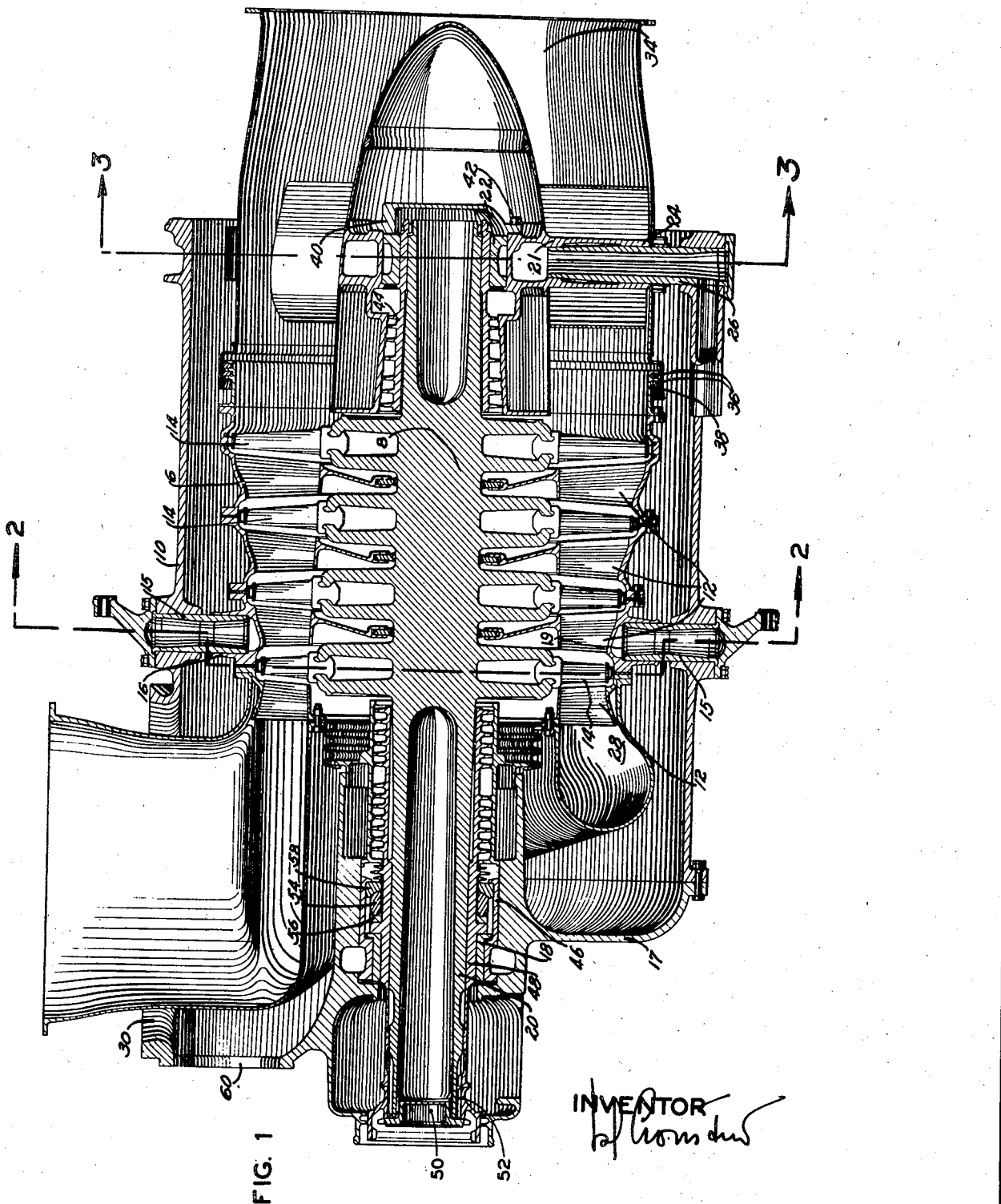
Fig. 1 is a sectional view through the turbine.
Figure 2:
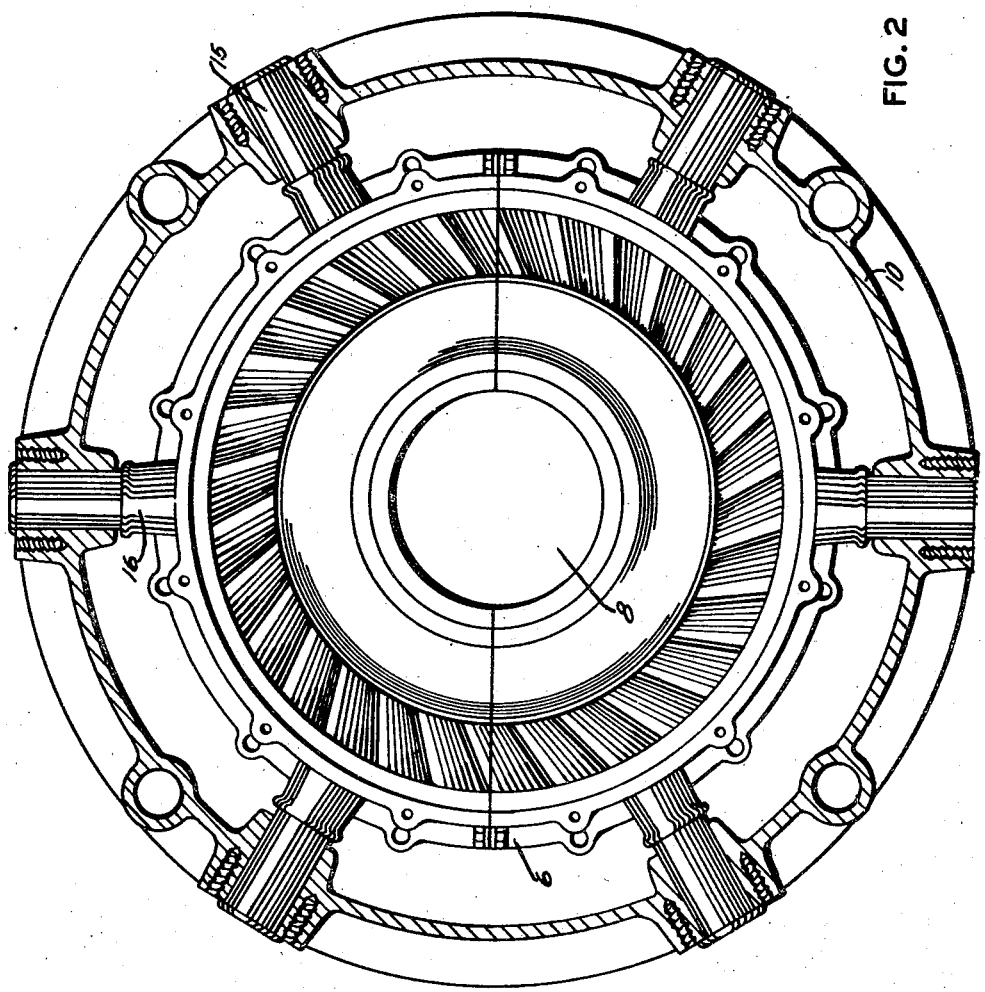
Fig. 2 is a sectional view of the casing and housing on line 2—2 of Fig. 1.
Figure 3:
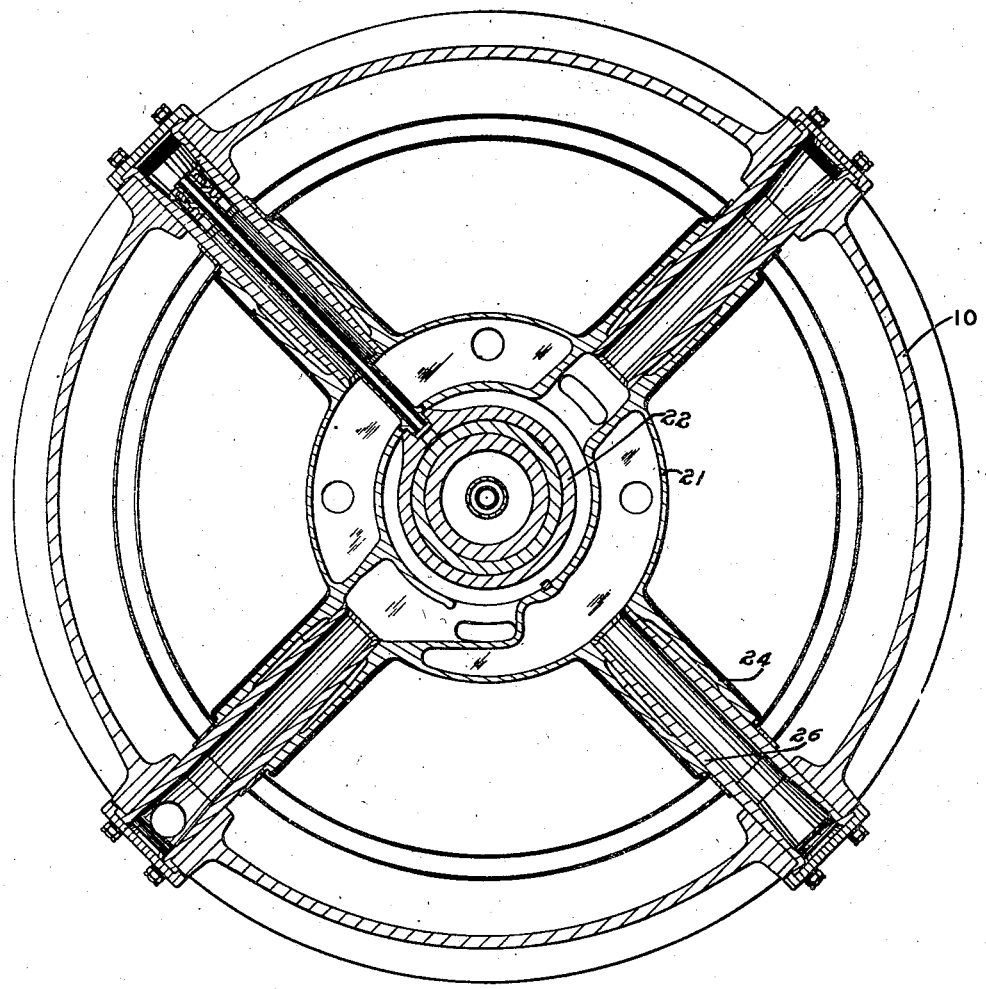
Fig. 3 is a sectional view on line 3—3 of Fig. 1.

The turbine as shown comprises a casing 6, and a rotor 8, both supported by an unsplit housing 10. Casing 6 has several parallel rows of circumferentially spaced nozzle-forming vanes 12 which alternate with rows of blades 14 on the rotor. The part of the rotor having these blades and the part of the casing having the vanes constitute the power section of the turbine.

Casing 6 is supported by radial pins 15 carried by the housing and engaging bosses 16 in the casing. These pins are all in the same radial plane and constitute the sole support for the casing. The casing is free to expand axially within the housing and is smaller in diameter than the housing at its plane of support, thus permitting the casing to expand radially without destroying its concentric alignment. Clearance 19 is also provided at the inner ends of pins 15 for radial expansion of the casing.

Housing 10 has a head 17 which forms a part of the housing and supports a bearing 18 for the front end of shaft 20, integral with rotor 8. At the other end of the rotor the housing has a spider 21 within which is a bearing 22 for the shaft. The spider has a number of legs 24 engaging radial supporting pins 26. The housing thus supports the rotor by spaced bearings engaging the shaft at opposite ends of the power section of the turbine, and the casing is also supported by the housing at points spaced from the shaft bearings.

Gases are conducted into the casing by scroll 28 connected to the casing and extending through an opening 30 in the housing to connect with an intake pipe, not shown. The scroll is spaced from housing 10 and head 17 so that transfer of heat from the scroll to the housing is minimized.

At the discharge end of the turbine casing, the gases are exhausted through a duct 34. The duct surrounds the spider 20 and is also held in concentric relation with the housing by supporting pins 24. The inner end of the duct engages resilient sealing rings 36 in grooves 38 in the casing so that the casing may expand axially and radially without a corresponding change in the position of the duct.

The intake scroll, the turbine casing, and the duct define a path for the turbine gases which is entirely separate from the housing so that the driving gases do not come in contact with the housing at any point and the housing remains cool.

Bearing 22 is clamped within the spider by a cap 40 held in place by screws 42 and the turbine shaft has a cooperating bearing sleeve 44.

At the other end of the turbine, bearing 18 is held within the head 17 which forms a part of the housing, by a supporting ring 46, and the turbine shaft has a cooperating bearing sleeve 48 held on the shaft by a threaded clamping ring 50 and cooperating splines 52.

The rotor 8 is held in place axially of the housing by a thrust bearing which may include a series of bearing shoes 54 carried by a ring 56 on sleeve 48. These shoes engage a stationary bearing ring 58 held in place by supporting ring 46.

Additional insulation of the housing may be provided by admitting air through an opening 60 in the forward end of the head 17. Air entering this opening ventilates the space between the housing and the parts of the turbine which define the gas path.

It is to be understood that the invention is not limited to the specific embodiment herein illustrated and described but may be used in other ways without departure from its spirit as defined by the following claims.

I claim:

1. In a turbine, a housing having spaced bearings therein, a casing within and spaced from the housing, a plurality of radial pins substantially in a single radial plane extending between the housing and casing and constituting the sole support for the casing within the housing, a turbine rotor within the casing and supported by the spaced bearings, said casing and rotor having cooperating rows of nozzles and blades, and an inlet scroll mounted on the casing and spaced from the housing, said housing having an opening through which the scroll extends.

2. In a turbine, an unsplit housing having spaced bearings therein, one of which is releasably mounted within the housing, a casing within and spaced from the housing, substantially radial pins in a single radial plane extending inwardly from the housing and constituting the sole support for the casing, said casing being smaller in diameter than the housing at the plane of support to permit expansion of the casing within the housing, and a turbine rotor within the casing and supported by the spaced bearings.

3. In a turbine, an unsplit housing having spaced bearings therein, one of which is releasably mounted within the housing, a casing within and spaced from the housing, substantially radial pins in a single radial plane extending inwardly from the housing and constituting the sole support for the casing, said casing being smaller in diameter than the housing at the plane of support to permit expansion of the casing within the housing, and a turbine rotor within the casing and supported by the spaced bearings, one of said bearings including a thrust bearing to limit the axial movement of the rotor at that point.

4. In a turbine construction, an unsplit cylindrical outer housing, a casing releasably positioned within the housing, said casing having its outside diameter less than the inside diameter of the housing to permit radial expansion of the casing means interconnecting the casing and housing for supporting the casing within the housing, said casing having at least one row of nozzles therein, and a rotor within said casing having at least one row of blades located adjacent to the row of nozzles, said rotor having its ends projecting beyond the ends of the casing, bearings for the ends of the rotor and bearing mountings supported directly by said housing and independently and separately of the casing, one of said mountings having releasable connections with the housing, whereby said mounting is removable to provide for assembly or disassembly of the turbine.

5. In a turbine construction, an unsplit cylindrical outer housing, a casing positioned within the housing, said casing having its outside diameter less than the inside diameter of the housing to permit radial expansion of the casing, a row of substantially radially extending pins substantially in a single radial plane, extending inwardly from the housing and engaging and constituting the sole support for the casing, said casing having at least one row of nozzles therein, and a rotor within said casing having at least one row of blades located adjacent to the row of nozzles, said rotor having its ends projecting beyond the ends of the casing, bearings for the ends of the rotor, and bearing mountings supported directly by said housing and separately from the pins that support the casing, one of said mountings having releasable connections with the housing, whereby said mounting is removable to provide for assembly or disassembly of the turbine.

6. In a turbine construction, a cylindrical outer housing, a casing positioned within the housing, said casing having its outside diameter less than the inside diameter of the housing to permit radial expansion of the casing, substantially radially extending pins located substantially in a single radial plane extending inwardly from the housing and engaging and supporting the casing, an inlet scroll connected to one end of the casing and extending through an opening in the housing, said scroll being entirely out of contact with the housing, said casing having at least one row of nozzles adjacent to the end of the inlet scroll through which the power fluid passes, and a rotor within said casing having at least one row of blades located adjacent to the row of nozzles on the discharge side, said rotor having its ends projecting beyond the ends of the casing, bearings for the ends of the rotor, and bearing mountings for said bearings, said bearing mountings being supported directly by said housing at points spaced from the radial pins.

7. In a turbine construction, a cylindrical outer housing, a casing positioned within the housing, said casing having its outside diameter less than the inside diameter of the housing to permit radial expansion of the casing, substantially radially extending pins located substantially in a single radial plane extending inwardly from the housing and engaging and supporting the casing, an inlet scroll connected to one end of the casing and extending through an opening in the housing, said scroll being entirely out of contact with the housing, said casing having at least one row of nozzles adjacent to the end of the inlet scroll through which the power fluid passes, and a rotor within said casing having at least one row of blades located adjacent to the row of nozzles on the discharge side, said rotor having its ends projecting beyond the ends of the casing, bearings for the ends of the rotor, and bearing mountings for said bearings, said bearing mountings being supported by said housing at points spaced from the radial pins, and means for admitting cooling air into the space between the casing and housing for cooling the housing.

8. In a turbine construction, a cylindrical outer housing, a casing positioned within the housing, said casing having its outside diameter less than the inside diameter of the housing to permit radial expansion of the casing, substantially radially extending pins located substantially in a single radial plane extending inwardly from the housing and engaging and supporting the casing, an inlet scroll connected to one end of the casing entirely out of contact with the housing, an exhaust duct connected to the other end of the casing and extending beyond the end of the housing and out of contact with the housing, said casing having at least one row of nozzles adjacent to the end of the inlet scroll through which the power fluid passes, and a rotor within said casing having at least one row of blades located adjacent to the row of nozzles on the discharge side, said rotor having its ends projecting beyond the ends of the casing, bearings for the ends of the rotor, and bearing mountings for said bearings, said bearing mountings being supported by said housing at points spaced from the radial pins.

9. In a turbine construction, a cylindrical outer housing, a casing positioned within the housing, said casing having its outside diameter less than the inside diameter of the housing to permit radial expansion of the casing, substantially radially extending pins located substantially in a single radial plane extending inwardly from the housing and engaging and supporting the casing, an inlet scroll connected to one end of the casing entirely out of contact with the housing, an exhaust duct connected to the other end of the casing and extending beyond the end of the housing and out of contact with the housing, said casing having at least one row of nozzles adjacent to the end of the inlet scroll through which the power fluid passes, and a rotor within said casing having at least one row of blades located adjacent to the row of nozzles on the discharge side, said rotor having its ends projecting beyond the ends of the casing bearings for the ends of the rotor, and bearing mountings for said bearings, said bearing mountings being supported by said housing at points spaced from the radial pins and means for admitting cooling air into the space between the casing and housing for cooling the housing.

10. In a turbine driven by hot gases, a turbine casing and a turbine rotor within said casing, said casing and rotor having cooperative nozzles and blades, in combination with a housing supporting both the casing and rotor, means interconnecting the casing and housing for supporting the casing within the housing, said housing having an opening for the admission of gas to the turbine, and an intake scroll extending through said opening for directing the driving gases into the casing, said scroll being connected to the casing and spaced from the housing.

VAL CRONSTEDT.

REFERENCES CITED

The following references are of record in the file of this patent:

UNITED STATES PATENTS

| Number | Name | Date |
|---|---|---|
| 1,021,225 | Wilkinson | Mar. 26, 1912 |
| 1,139,696 | Maxwell | May 18, 1915 |
| 1,477,360 | Junggren | Dec. 11, 1923 |
| 1,522,191 | Junggren | Jan. 6, 1925 |
| 1,541,834 | Losel | June 16, 1925 |
| 1,554,230 | Pochobradsky | Sept. 22, 1925 |
| 1,670,452 | Kachler | May 22, 1928 |
| 1,825,580 | Collingham | Sept. 29, 1931 |
| 1,985,964 | Warren | Jan. 1, 1935 |
| 2,080,425 | Lysholm | May 18, 1937 |
| 2,288,734 | Noack | July 7, 1942 |
| 2,282,894 | Sheldon | May 2, 1942 |
| 1,294,245 | Doran | Feb. 11, 1919 |
| 1,889,554 | Kennedy | Nov. 29, 1932 |

FOREIGN PATENTS

| Number | Country | Date |
|---|---|---|
| 4,157 | Great Britain | Feb. 24, 1908 |
| 76,744 | Austria | June 10, 1919 |